United States Patent [19]
Waldhoff

[11] Patent Number: 5,316,343
[45] Date of Patent: May 31, 1994

[54] VIDEO GAME HIGH-SCORE APPLIQUE

[75] Inventor: Douglas T. Waldhoff, Maple Grove, Minn.

[73] Assignee: Label Masters, Inc., Minneapolis, Minn.

[21] Appl. No.: 893,713

[22] Filed: Jun. 5, 1992

[51] Int. Cl.⁵ .............................................. B42D 15/00
[52] U.S. Cl. ......................................... 283/70; 283/81
[58] Field of Search ........................ 283/81, 70, 71, 94, 283/98, 101, 107, 109, 49; 40/299, 312, 327, 360, 625, 630, 638; 428/40–42, 46

[56] References Cited

U.S. PATENT DOCUMENTS

| | | | |
|---|---|---|---|
| 2,648,924 | 8/1953 | Brewster | 283/81 X |
| 3,674,622 | 7/1972 | Plasse | 283/109 X |
| 3,854,229 | 12/1974 | Morgan | 283/81 X |
| 4,757,901 | 7/1988 | Woods | 283/81 X |
| 4,951,970 | 8/1990 | Burt | 283/81 X |
| 5,024,332 | 6/1991 | Stachler | 283/81 X |

Primary Examiner—Mark Rosenbaum
Assistant Examiner—Willmon Fridie, Jr.
Attorney, Agent, or Firm—Lawrence M. Nawrocki

[57] ABSTRACT

An applique for affixation to a surface of a video game cartridge. The applique is a thin profile sheet so that, when it is affixed to the game cartridge, it does not appreciably alter the dimensions of the cartridge. The applique is provided with a first side on which indicia is printed and spaces are provided where information can be recorded with respect to the highest score achieved by a player playing the game. The first surface of the applique can be plasticized so that information can be written in the appropriate locations and erased once a particular high score is surpassed. An opposite side of the applique is provided with an adhesive to effect affixation of the applique to the game cartridge body.

2 Claims, 1 Drawing Sheet

VIDEO GAME HIGH-SCORE APPLIQUE

TECHNICAL FIELD

The present invention deals broadly with the field of video games. More specifically, however, it deals with appliques which can be applied to the cartridge body of a video game for a number of purposes. Specifically, the present invention is directed to an applique affixable to a video game cartridge body so that information can be written and erased, or another applique applied over or in place of the first applique, to memorialize the high score achieved by a player in playing the game, the name of the person achieving the high score, the date the score was achieved, etc.

BACKGROUND OF THE INVENTION

The video game industry has burgeoned during the decade of the 1980's. An individual only need visit a toy or game shop or video rental facility, and he or she becomes quickly aware of the hundreds of offerings in the vide game area. Choices such as MARIO BROTHERS, SUPER MARIO BROTHERS, ADVENTURE ISLAND, and various games having, as "participants", well-known cartoon characters are available. Such games are manufactured and offered by companies such as NINTENDO, SEGA, GENISIS, etc.

In playing games of a nature as discussed above, points are scored, and a score is achieved in view of the occurrence of a number of events as a participant plays the games. The higher the point total, the more effective the player has been and the more expert he or she is in the particular game.

Typically, one particular player may want to keep track of the highest score he or she has achieved. In most cases, this is done by the person remembering the highest point total he or she has every acquired. In other cases, a number of individuals—the same ongoing group, for example—may, on a regular basis, compete against one another. For example, siblings in one family, or a number of neighborhood friends, might play a particular game which happens to be the fad at any time. The competition can be intense to achieve a higher score than any previous player. In circumstances such as these, it is desirable that the highest score anyone achieves not be left to memory. It is, therefore, advantageous to memorialize the score at a convenient and accessible location so that the statistics with regard to the highest score anyone has every achieved from the group be able to be readily ascertained.

As will be able to be seen, the memorialized information would, typically, be subject to frequent changes. Consequently, any manner in which memorialization is provided should be such that it can be easily and quickly updated as changes occur.

It is to these dictates and problems of the prior art that the present invention is directed. It is a device for permitting memorialization of information regarding the highest score achieved in playing a video game which takes into account all desirable characteristics for such a device.

SUMMARY OF THE INVENTION

The present invention is a device, as discussed hereinbefore, for enabling information with regard to the highest score achieved in playing a particular game to be memorialized. As a result, any subsequent player of the game knows, after completion of his or her turn, whether the previously highest score achieved has been surpassed. The device is intended to be attached to a cartridge body of the video game. It includes a thin sheet having at least one defined location at which score information can be affixed. Also included are means for attaching the thin sheet to a surface of the cartridge body.

It is envisioned that, in a preferred embodiment of the device, the thin sheet would have oppositely facing first and second sides. The first side (that is, one which would be intended to face away from the cartridge body) would be provided with at least one space at which the highest score previously achieved could be affixed. More typically, however, space could be provided for the insertion of more complete information such as, in addition to the score achieved, the name of the participant having achieved the score and the date on which the score was achieved. Other information could be provided if desired.

It is envisioned that indicia defining locations at which such information would be inserted would be printed on the first surface of the sheet. Such indicia would be permanent and would not be able to be erased. The first surface of the sheet, however, could be overlain with a plasticized lamina to define a surface on which changing information could be written and from which superseded information could be erased, although alternatives are contemplated. For example, the first surface of the sheet could be varnished or another sheet could be applied over, or in place of, a prior sheet.

If desired, pictorial indicia, indicative of achievement, could also be provided on the first surface of the sheet. Such information could take the form of a trophy or other similar indicia. The provision of such other indicia would serve the purpose of making the device in accordance with the present invention more attractive. When such indicia would be provided, it would, typically, be printed on the first surface of the sheet underneath a transparent lamina which could overlie the first surface of the sheet.

Typically, a video game cartridge body is provided with generally-planar upper and lower surfaces. It is envisioned that the applique device in accordance with the present invention would be shaped and sized to fit on one of these cartridge body surfaces. To this end, the second side of the thin sheet would be appropriately provided with an adhesive layer to adhere the sheet to the surface of the cartridge body. Any appropriate adhesive sufficient to provide an adequate affixation of the sheet to the cartridge could be employed.

It is envisioned that the adhesive layer would be provided with a peel-off release sheet overlying the adhesive. By providing such a release sheet, the tack of the adhesive could be maintained until affixation of the applique to the cartridge body was intended.

As will be able to be seen then, a single applique can be employed for numerous writings of information and erasure thereof. If a particular thin sheet becomes worn, it can merely be removed and a replacement sheet affixed to the cartridge body in its place.

The present invention is thus an improved applique for affixation to a video game cartridge body to provide for memorialization of high score information. More specific features and advantages obtained in view of those features will become apparent with reference to the DETAILED DESCRIPTION OF THE INVEN-

DETAILED DESCRIPTION OF THE INVENTION

Figure 1:
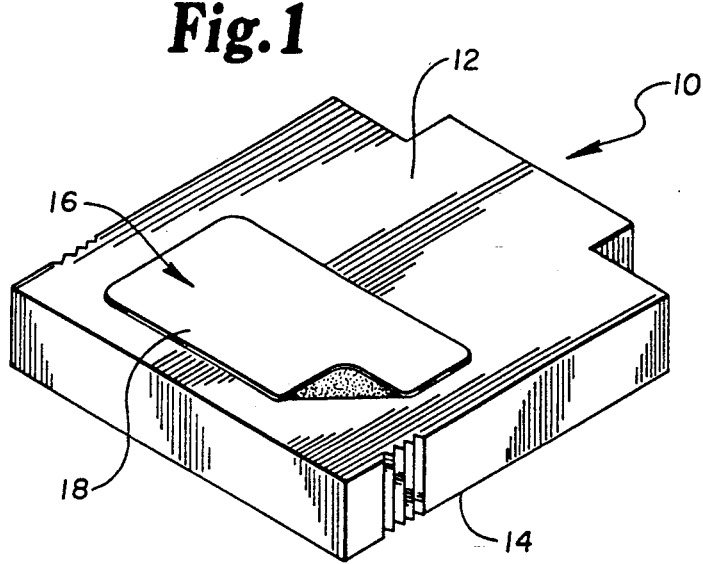
FIG. 1 is a perspective view of the present invention showing the environment in which it is intended to be used.

FIG. 1 illustrates a video game cartridge of the type with which the present invention is intended to be used. That cartridge is shown as having oppositely-facing, generally-planar upper and lower surfaces 12, 14. In virtually every case, these surfaces 12, 14 are the largest continuous planar surfaces of the video game cartridge body 10. It is intended that a device in accordance with the present invention be applied, typically, to the upper of these two surfaces 12. FIG. 1 illustrates an applique 16 in accordance with the present invention so applied to the upper surface 12 of the cartridge body 10. As best seen in FIG. 1, a device for memorializing information regarding the highest score achieved in playing a video game in accordance with the present invention includes a thin sheet 18. Where a thin sheet 18 is employed in accordance with the invention, the dimensions of the game cartridge body 10 are not appreciably increased. Consequently, the cartridge will not become precluded from being received within a socket in a machine for receiving a cartridge (not shown) therewithin.

Figure 2:
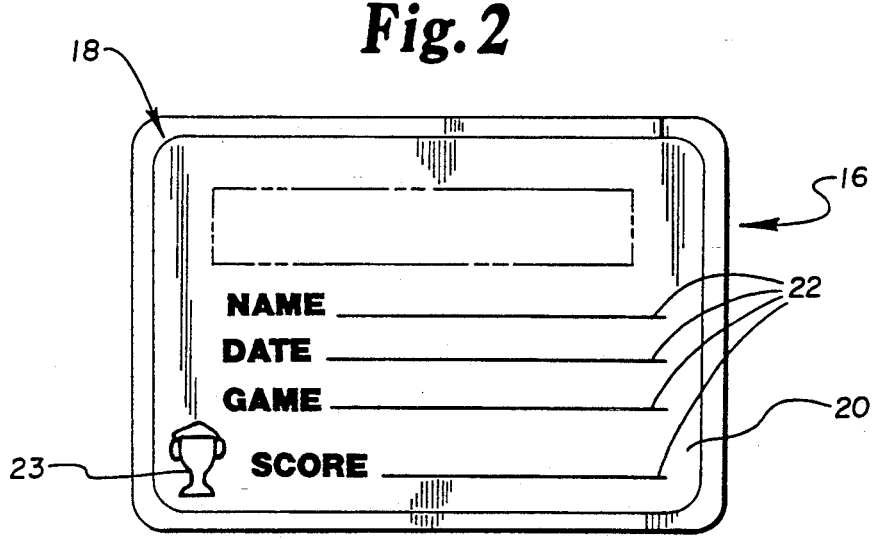
FIG. 2 is a top plan view of the present invention, showing the layout of the graphics.
Figure 3:
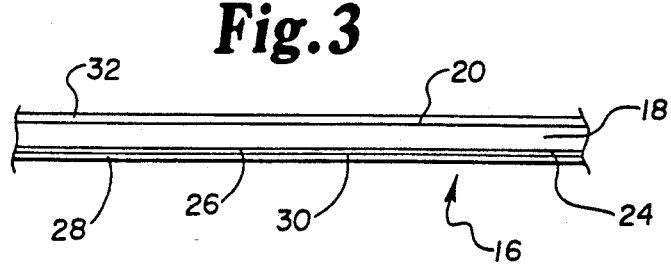
FIG. 3 is an enlarged side sectional view showing the laminar structure of the device.

FIGS. 2 and 3 illustrate the specifics of the present applique. A first side 20 of the sheet 18 is provided with defined locations 22 for the memorialization of various information. The particular applique 16 illustrated in FIG. 2 is provided with defined locations at which the name of the individual achieving the highest score of record, the date on which the score was attained, the particular game, and what that score was, can be recorded. If desired, pictorial indicia, such as a trophy 23 can be printed on the applique 16. Employment of such pictorial indicia encourages participants to seek to achieve the highest score so that his or her name can be memorialized on the applique 16. A sense of competition is, thereby, fostered.

FIG. 3 illustrates, in cross-section, one embodiment of the applique 16. The thin sheet 18 is provided with a layer of adhesive 24 on a side 26 thereof which faces opposite that on which the recording locations 22 and other indicia are provided. Typically, the applique 16 would be provided with a peel-off release sheet 28 overlying the adhesive layer 24. The release sheet 28 would be maintained in its location overlying the adhesive 24 at all times prior to the intended application of the applique 16 to the body of a video game cartridge 10. The tacky surface 30, which ultimately functions to effect securement of the applique 16 to the cartridge body 10, is, thereby, protected.

When the owner, for example, wishes to mount an applique 16 to the cartridge body 10, the peel-off release sheet 28 can be pulled back from the adhesive 24 to expose the tacky surface 30. The device in accordance with the present invention can than be positioned at an intended location of application on a surface 12 of the video game cartridge body 10. Pressure can be applied to effect secure mounting of the applique 16 at that location.

The applique device 16 illustrated in FIG. 3 is shown as being provided with a transparent lamina 32 overlying the surface 20 of the thin sheet 18 which has the indicia printed thereon. Such a lamina 32 has characteristics wherein writing using, for example, a marker pencil, could be applied thereto yet easily erased. Consequently, as information with regard to the highest score achieved in playing the game changes, the information on the applique 16 can also be changed easily.

It will be understood that the invention is intended to include embodiments which do not necessarily incorporate a transparent lamina 32. Specifically contemplated is an embodiment wherein a shiny surface on a first side of the applique 16, such as one created by varnishing, is provided. The invention also is intended to include an embodiment wherein a plurality of appliques are intended, each having its own indicia, one particular sheet either being discarded or overlain with another sheet as a particular score recorded on the one sheet is surpassed.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for memorializing information regarding the highest score achieved in playing a video game stored on a medium in a specialized cassette cartridge body, said medium having the video game recorded permanently thereon, comprising the steps of:
    (a) providing a thin sheet having a first side and a second side, said first side having at least one location defined thereon to accept affixation of score information;
    (b) affixing said thin sheet to said cartridge body by adhesively binding said second side of said thin sheet to said cartridge body; and
    (c) marking the highest score achieved by a player of the video game on said thin sheet at said defined location.

2. The method of claim 1, wherein the thin sheet is removed and replaced by another sheet as one sheet deteriorates.

* * * * *